United States Patent [19]

Deman et al.

[11] Patent Number: 4,551,853
[45] Date of Patent: Nov. 5, 1985

[54] APPARATUS FOR PROCESSING SPEECH IN RADIOELECTRIC TRANSMITTER/RECEIVER EQUIPMENT SUITABLE FOR TRANSMITTING AND RECEIVING SPEECH

[75] Inventors: Pierre Deman, Paris; Jean Potage, Franconville, both of France

[73] Assignee: Thomson CSF, Paris, France

[21] Appl. No.: 548,563

[22] Filed: Nov. 3, 1983

[30] Foreign Application Priority Data

Nov. 10, 1982 [FR] France .................. 82 18095

[51] Int. Cl.[4] .............................. H04B 1/64
[52] U.S. Cl. ...................... 455/72; 333/14; 381/106
[58] Field of Search .......... 455/72; 333/14; 370/7; 381/106; 375/26, 30, 32, 38

[56] References Cited

U.S. PATENT DOCUMENTS

| | | | |
|---|---|---|---|
| 3,602,818 | 8/1971 | Anderlecht et al. | 333/14 |
| 4,123,711 | 10/1978 | Chow | 455/72 |
| 4,271,499 | 6/1981 | Leveque | 370/7 |
| 4,295,223 | 10/1981 | Shutterly | 455/72 |

FOREIGN PATENT DOCUMENTS 0115009 9/1979 Japan ..................... 455/72

OTHER PUBLICATIONS

"High-Quality Radiotelephone Communication"—Sharp Electronic Engineering, vol. 42, No. 506, pp. 74–77, Apr. 1970.

Primary Examiner—Marc E. Bookbinder
Attorney, Agent, or Firm—Cushman, Darby & Cushman

[57] ABSTRACT

Apparatus for processing speech in radioelectric transmitter/receiver equipment is adapted to transmitting and receiving speech. The apparatus comprises a compression circuit for compressing the dynamic range of the speech signal, said compression circuit being formed by at least one variable transmission attenuator for maintaining the level of speech modulation substantially constant throughout speech transmission. An expander re-establishes on reception the level of speech before it was compressed. An expander control device is responsive to the attenuation value applied by the transmission attenuator and transmitted over an auxiliary radioelectric frequency channel of the equipment. The compression circuit is an incremental compression circuit with a time anticipated action. A logical filter circuit for filtering the level of the transmission speech is also provided for controlling the compression circuit in constant attenuation steps in such a manner as to maintain the transmission speech level substantially constant and for transmitting the corresponding incremental attenuation values over the auxiliary channel. The expander control device includes an interpolation circuit for correcting presumed errors in the received signals representative of the attenuation values applied on transmission by the logical filter circuit.

13 Claims, 5 Drawing Figures

APPARATUS FOR PROCESSING SPEECH IN RADIOELECTRIC TRANSMITTER/RECEIVER EQUIPMENT SUITABLE FOR TRANSMITTING AND RECEIVING SPEECH

The present invention relates to apparatus for processing speech in radioelectric transmission/receiver equipment suitable for transmitting and receiving speech and capable of being used, in particular, in radiotelephony.

BACKGROUND OF THE INVENTION

Known analog systems exist for processing speech for transmission by radio. One system of this type is known as "LINCOMPEX" and, by means of variable attenuation at the transmitter end, it enables the speech modulation level to be maintained more or less constant for a period of a few tens of milliseconds. This considerably improves the signal/noise ratio obtained at reception. In such systems, the value of the attenuation applied before transmission is itself transmitted via a frequency multiplexed auxiliary channel by frequency modulation of a sub-carrier situated at the top of the telephone band. The modulated sub-carrier is used to control an expander located at the receiver, i.e. a second attenuator having the reverse function of the attenuator used at the transmitter, whereby the speech level prior to compression is restored. Such purely analog systems are used in radiotelephony, in particular for decametric wavelengths.

An improvement to the "LINCOMPEX" system is known under the name "SYNCOMPEX". In the "SYNCOMPEX" system, speech is processed in packets of finite duration (13.33 milliseconds) and an auxiliary channel in the form of an auxiliary radioelectric frequency channel is used to transmit digitally encoded data. The corresponding codes are transmitted by frequency shift keying modulation (FSK modulation). This data is diversity propagated over two sub-carriers both of which are inserted in the voice band. In this system, the speech components existing in the bands used for transmitting the FSK channels are eliminated. Diversity transmission in which the digital data is transmitted over two different channels enables the receiver to choose the channel which has the better signal to noise ratio, and consequently limits transmission errors as much as possible.

However, there remains a problem in using these systems for so-called adaptive algorithms, which, for example, use differential coding for encoding speech in digital form and for taking advantage of the peculiarities of the dynamic range of speech and of the different degrees of sensitivity of the human ear to various kinds of degradation, and for reducing the binary data rate of the speech as transmitted between the transmitter and the receiver, since such arrangements always produce the result that the reduced data rate of coded speech samples increases the sensitivity of the system to errors in transmission and that these errors cannot be corrected by simple processing methods.

The dynamic range of amplitude variations in the speech signal produced by a speaker comprises a syllabic term and a melodic term.

The syllabic term is a high amplitude term having an amplitude of about 30 decibels for some speakers and its frequency band goes from very low frequencies to about 10 Hz. The average syllabic rate is generally about 4 to 7 Hz. In practice, the syllabic term is not significant in speech intelligibility and it is not therefore very important in providing agreeable transmission. However, it is used in transmission to improve listening comfort by eliminating radioelectric noise during silences in speech, and it is also used in conventional telephony for stabilizing amplifier circuits by conserving the equivalent.

The melodic term has a smaller amplitude of 10 to 15 decibels and its frequency band covers the spectrum from about 6 to 250 Hz depending on the speaker. The melodic term is extremely important to hearing cognation and to speaker recognition, and it is therefore essential that its frequency should be accurately reproduced.

Unfortunately, in known devices which perform adaptive digital transmission of speech, the transmission noise contains at least as many harmonic frequencies of the melodic spectrum as signals significant to syllabic adaptation, which causes reception errors that cannot be eliminated by simple processing methods using, for example, analog filters.

An object of the present invention is to remedy the above drawbacks.

SUMMARY OF THE INVENTION

The present invention provides apparatus for processing speech in radioelectric transmitter/receiver equipment suitable for transmitting and receiving speech. The present invention includes a compressor circuit for compressing the dynamic range of the speech signal and is formed by at least one variable transmission attenuator for maintaining the speech modulation level substantially constant during speech transmission. The present invention also includes an expander for re-establishing, on reception, the level of the speech prior to its being compressed, together with an expander control device which is responsive to the value of the attenuation applied by the transmission attenuator and transmitted over an auxiliary radioelectric frequency channel of the equipment. The compressor circuit is an incremental compressor circuit with a time anticipating function. The apparatus further includes a logical filter circuit for filtering the level of the transmission speech to control the compressor circuit in constant attenuation steps whereby the level of the transmission speech is maintained substantially constant, and for transmitting the corresponding incremental attenuation values over the auxiliary channel. The device for controlling the expander includes an interpolation circuit for correcting the presumed errors in the received signals which are representative of the values of attenuation applied on transmission by the logical filter circuit.

Some of the advantages obtained by apparatus in accordance with the invention are firstly, it is possible to provide a genuine filtering device at the receiver end for separating significant adaptation signals from noise, and secondly, as a corollary, it is possible to correct errors in transmission which might give rise to an inteference signal whose frequency spectrum would include frequencies in the melodic spectrum. The first advantage is achieved by means of an incremental compressor with anticipating action which enables the adaptation signal to be anticipated by delaying the speech signal so as to correctly transmit the beginnings of the spoken syllables where the amplitude increases rapidly, the syllables being transmitted in phase with the corresponding adaptation signals. Since the adaptation signals are transmitted with a time shift relative to the acoustic signal to which they relate, it is possible to make, or reception, improved quality decisions in the generation of adaptation control signals. At the same time, suitable means can be used to bring the adaptation signal into time coincidence with the received acoustic signal. The second advantage is achieved by the interpolation circuit which corrects transmission errors that are liable to produce an adaptation signal including frequencies that correspond to the melodic spectrum. Finally, the combined action of the logical filter and of the delay inserted on transmission of the speech signal by the anticipating compression circuit, make it possible to considerably reduce the passband of the auxiliary channel.

BRIEF DESCRIPTION OF THE DRAWINGS

An embodiment of the invention is described by way of example with reference to the acompanying drawings, in which.

DESCRIPTION OF THE PREFERRED EMBODIMENT

Figure 1:
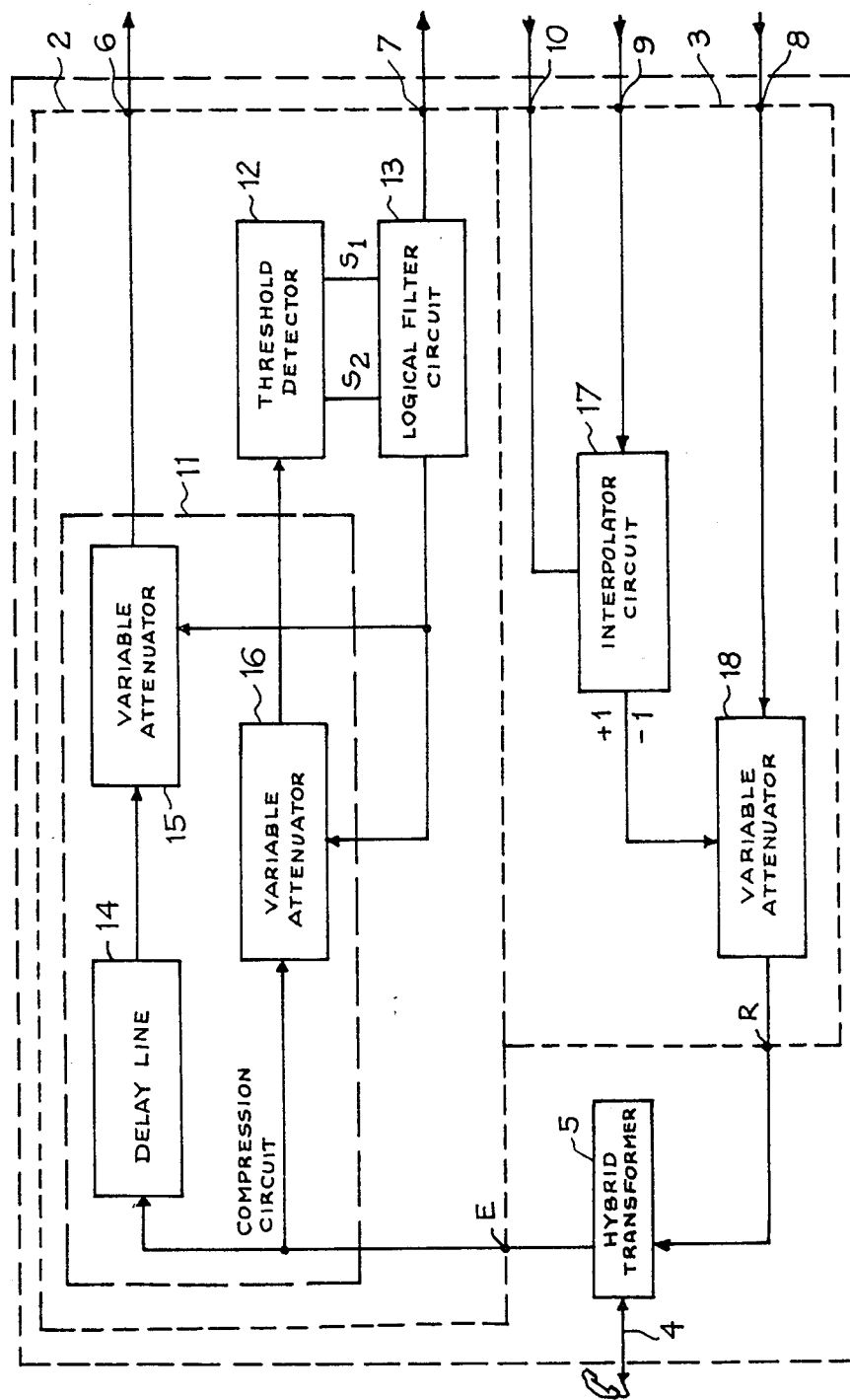
FIG. 1 is a block diagram of an embodiment in accordance with the invention located in a radio terminal capable of simultaneous transmission and reception in both directions (full duplex mode)

FIG. 1 is a block diagram of duplex apparatus 1 in accordance with the invention, i.e. comprising a transmitter portion 2 and a receiver portion 3. The apparatus is connected via a hybrid transformer 5 to a telephone line 4 over which speech signals pass. In addition to its two-way two-wire connection with the telephone line 4, the hybrid transformer 5 has an input which is directly connected to the output R from the receiver portion 3 and an output which is directly connected to the input E of the transmitter portion 2. The transmitter portion 2 of the apparatus 1 is connected via an output 6 to the radio-electric transmission circuit of the transmitter (not shown) and conveys a speech signal to the transmitter at a level which is maintained more or less constant. The transmission portion 2 further includes an output 7 which is connected to the transmission circuit of the transmitter (not shown) to convey coded data concerning the level of the speech signal on an auxiliary transmitter channel (not shown). The receiver portion 3 has an input 8 which is connected to the receiver circuit (not shown) of the transmitter/receiver to receive a demodulated speech signal. The receiver portion also includes further inputs 9 and 10. The input 10 is connected to the reception circuit of the transmitter/receiver (not shown) which is connected to the auxiliary level channel. The input 10 is connected to the demodulation circuit (not shown) of the receiver and receives a weighting signal e therefrom whenever uncertainty exists concerning the demodulated content of the data received via the auxiliary channel. The transmission portion 2 includes a compression circuit 11 connected to a threshold detector 12 and a filter circuit 13. The compression circuit 11 includes a delay line 14 situated between the input E of the transmission portion and the input of a variable attenuator 15. The compression circuit 11 also comprises a variable attenuator 16 whose input is connected to the input E of the transmission portion 2 and whose output is connected to the input of the threshold detector 12. The threshold detector 12 is connected via outputs $S_1$ and $S_2$ to respective inputs of the logic filter circuit 13. The logic filter circuit 13 has two outputs, one of which is connected to the output 7 from the apparatus 1 and the other of which is connected to the control inputs of the variable attenuators 15 and 16. The output from the variable attenuator 15 is connected to the output 6 of the device 1 to apply the transmission speech signal thereto. The receiver portion includes an interpolator circuit 17 connected by two inputs to the inputs 9 and 10 of the apparatus 1 on which it receives respectively the level-representing data received over the auxiliary channel and the weighting signal e whose presence indicates that an error is assumed to exist in the level-representing data which is received simultaneously therewith. The interpolator circuit 17 has an output connected directly to the control input of the variable attenuator 18. The variable attenuator 18 has an input directly connected to the input 8 of the apparatus 1 for receiving the demodulated speech signal from the receiver circuits (not shown) and has an output directly connected to the output R from the receiver portion.

The apparatus shown in FIG. 1 operates as follows. The speech signal transmitted by the telephone channel 4 is applied to the input E of the receiver portion 2 via the hybrid transformer 5. The speech signal passes through the compression circuit 11 by passing successively through the delay line 14 and the attenuator 15, and then leaves the apparatus 1 via the output 6. The threshold detector 12 serves to detect changes in the power level of the un-delayed speech signal which passes through the variable attenuator 16, and signals these changes to the logical filter circuit 13 via the outputs $S_1$ and $S_2$. As a function of the changes in level detected by the threshold detector 12, the logical filter circuit 13 controls both attenuators 15 and 16 and also encodes level-representing data for transmission over the output 7.

On reception, the speech signal is demodulated by the receiver circuits (not shown) and is applied to the input terminal 8 of the variable attenuator 18 which is under the control of the interpolator circuit 17. The variable attenuator 18 controlled by the interpolator circuit 17 ensures dynamic expansion of the speech signal to reconstitute, at the input to the hydrid transformer 5, the speech signal with its original dynamic range. The interpolator circuit 17 makes use of the coded level-representing data which is representative of level attenuation decisions and transmitted over the level auxiliary channel and applied to the input 9. The interpolator circuit 17 also makes use of the weighting signal e as applied to its input 10, and this signal may, for example, be a simple on/off erase signal for optionally erasing a decision to modify the attenuation of the received level. This would be particularly applicable on occasions when the radio transmission is subject to fading and the level-representing data transmitted by the level channel is interlaced in a digital frame which also contains the speech channel. Thus, when transmitting speech at 16 K/bits per second, binary level-representing data could be transmitted once every 48 bits. In which case it would then be possible to provide an inhibit/enable signal which is good for 49 bits in the event of fading. The decision to control the attenuator 18 is made taking into account the contraints imposed by the signal transmission in order to reconstitute values of the bits which are lost in such a manner as to introduce a minimum of components in the melodic frequency band.

The attenuators 15, 16 and 18 used to implement the preferred embodiment of the invention are static incremental attenuators including a weighting box, and capable of applying attenuation in differential steps under the control of a given clock, e.g. in steps of 0, +3 or −3 decibels every 6 milliseconds. The level-representing data may be encoded as a string of bits having a first configuration when the level before compression of the syllabic term of the speech is in an increasing phase, a second configuration when the level of the syllabic term of the speech is in a decreasing or shrinking phase, and at least one third configuration when the level of the syllabic term remains substantially constant. In the following description, delta type coding is used to encode the level-representing data. Incrementation commands provided by the filter logic and by the interpolator circuit only become effective when two consecutively received level-encoding signals have the same value. Thus, if A and Z respectively designate the delta coding signals used, an increase or a decrease in speech level above or below acceptable thresholds is encoded by means of two consecutive signals ZZ for causing an attenuation of +3 decibels and two consecutive signals AA for causing an attenuation of −3 decibels. There is no change in attenuation when the consecutively received signals alternate, regardless of whether they alternate ZA or AZ. The A and Z signals are transmitted over the auxiliary channel by using a sub-carrier at a frequency $f_0$ for transmitting signal A and a sub-carrier of frequency $f_1$ for transmitting the signal Z. In a first variant of the invention which is simple to implement, the apparatus could simply ignore pairs of A signals or pairs of Z signals which are marked by the simultaneous presence of weighting signal e, indicating that the received signal is presumed to be erroneous.

In a more complex second variant embodiment of the invention, the attenuators may be controlled in such a manner as to take account only of variations in level which correspond to the syllabic term of the speech, and which take account of alternating consecutive phases of growth and shrinkage. Control signals are then chosen to last for sufficient time to ensure that the fundamental frequency of the control signals, as applied to the attenuators, does not exceed 10 Hz. An increase signal is applied when the peak signal detected by the threshold detector 12 exceeds a first threshold and a decrease signal is applied when the signal detected by the threshold detector 12 over an elementary period of time is less than a second threshold, for example less than a threshold which is 3 decibels from the first threshold for a period of time exceeding the longest melodic period, i.e. about 18 milliseconds, and provided the first threshold is not exceeded during said period. It would be possible to choose for the increasing phases, hereinafter referred to as positive phases, and for the decreasing phases, hereinafter designated negative phases, a minimum duration for each of 42 milliseconds, in which case the fundamental period of syllabic term of the speech cannot be less than 99 milliseconds.

The detailed structure of the variable attenuators 15 and 16 is well known to the person skilled in the art, for example they could be implemented by bridges of attenuation resistors which are electronically connected by means of PIN diodes.

Figure 2:
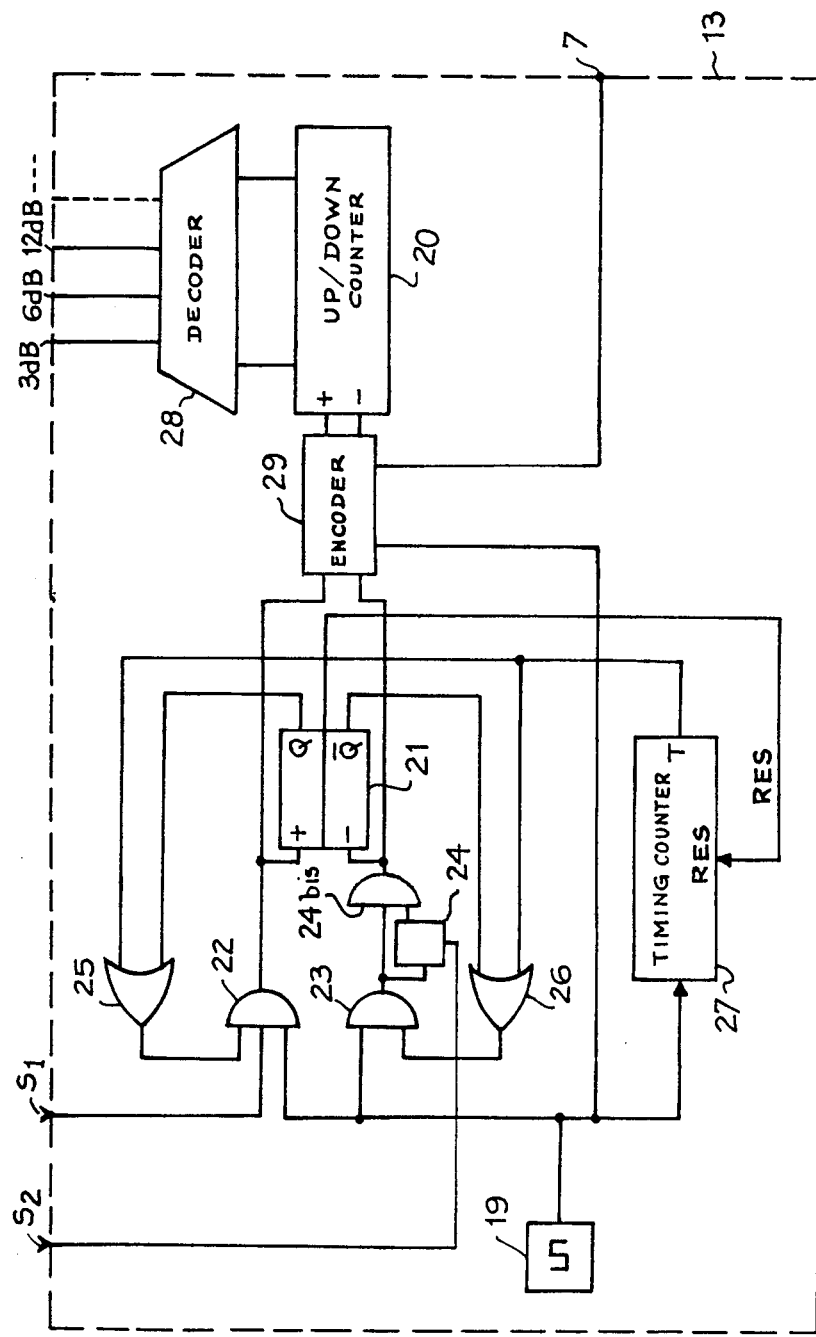
FIG. 2 is a circuit diagram of a logical filter in accordance with the invention associated with a differential encoder.

One implementation of the filter logic 13 will now be described with reference to the block diagram in FIG. 2. The logical filter circuit 13 includes a clock 19, an up/down counter 20, a bistable device 21 under the control of gates 22 and 23, a counter 24 associated with an AND gate 24bis or OR gates 25 and 26, a timing counter 27, a decoder 28 having its inputs connected to the outputs of the up/down counter 20 and an encoder 29 for encoding level-representing data.

The outputs of the up/down counter 20 provide signals which are decoded by the decoder 28 in order to set the attenuation value of the variable attenuators 15 and 16 of FIG. 1. The up/down counter 20 is itself controlled via the encoder 29 which causes it to count up by applying a signal to the input marked "+" and to count down by applying a signal to the input marked "−". The up count signal is applied from the output of the AND gate 22 and the down count signal is applied from the output of the AND gate 24bis. The AND gate 22 has three inputs, a first input is connected to the output $S_1$ from the threshold detector 12 which transmits a signal indicating that the speech level has exceeded the first threshold, the second input is connected to the output of the clock 19, and the third input is connected to the output from the OR gate 25. The OR gate 25 has two inputs, the first input is connected to the Q output of the bistable device 21 and the second input is connected to the first input of the OR gate 26 and also to the output marked "T" from the timing counter 27.

The AND gate 23 has two inputs, a first input is connected to the output from the clock 19 and the second input is connected to the output from the OR gate 26. The output from the AND gate 23 is connected firstly to a first input of the AND gate 24bis and secondly to the count input of the counter 24. The count output from the counter 24 is connected to the second input of the AND gate 24bis. The reset to zero input of the counter 24 is connected to the output $S_2$ from the threshold detector 12 of FIG. 1. Thus, the counter 24 counts clock pulses from the clock 19 when enabled by the OR gate 26 via the AND gate 23, and is reset to zero by the presence of a signal on the output $S_2$ from the threshold detector 12. If the signal at the output $S_2$ from the threshold detector 12 is absent during a given number of clock pulses 19, the counter 24 forwards a corresponding end of count signal to open the gate 24bis.

The OR gate 26 has two inputs, a first input is connected to the T output from the counter 27 and the second input is connected to the $\overline{Q}$ output from the bistable device 21. The clock input to the counter 27 is connected to the output from the clock 19 and its reset to zero input RES is connected to the bistable device 21 which applies a reset to zero pulse to the counter 27 each time the bistable device 21 changes state. The outputs from the decoder 28 are directly connected to control inputs of the variable attenuators 15 and 16 in order to apply attenuation values thereto at constant intervals, e.g. 3, 6, 12 decibels, etc., with the value of attenuation changing by successive steps of + or −3 decibels. The encoder 29 has its inputs connected respectively to the outputs from the AND gates 22 and 24bis and conveys signals for encoding the level-representing data to the transmission circuits (not shown) via output 7 synchronously with the clock signals delivered by the clock 19. These signals are provided by delta type encoding as described above. The encoder 29 also provides the up and down controlling signals which are applied to the inputs "+" and "−" of the up/down counter 20.

The logical filter circuit 13 shown in FIG. 2 operates as follows. The clock signal provided by the clock 19 is a binary signal having two states and a period of 6 milliseconds. It is applied to respective inputs of the AND gates 22 and 23. The clock signal is forwarded by the AND gate 22 whenever a threshold exceeding signal is delivered by the output $S_1$ of the threshold detector 12 in FIG. 1 and the AND gate 22 is sumultaneously enabled by the output from the OR gate 25. Likewise, the clock signal from the clock 19 is applied to the clock input to the AND gate 23 and is forwarded via the output from the AND gate 23 whenever gate 23 is enabled by the output from the OR gate 26. The output signal from the AND gate 23 causes the counter 24 to count. If a second threshold exceeding signal appears on the output $S_2$ of the threshold detector 12 of FIG. 1, the counter 24 is reset to zero. Whenever the counter 24 has counted three 6 millisecond pulses, i.e. a total of 18 milliseconds, its count output enables the AND gate 24bis. Pulses from the outputs of the AND gates 22 and 24bis control the inputs marked "+"and "−"respectively of the bistable device 21 and of the encoder 29.

The encoder 29 outputs a binary signal on each pulse from the clock 19. The value of this binary signal is a function both of the value of the preceding binary signal and of the variation control which may be positive, negative or nil. If the variation control is nil, i.e. if there is no variation in the voice signal, the binary signal output from the encoder 29 is inverted with respect to its preceding binary output signal. Each time the voice level increases, the first binary signal Z is output and it is followed by a second binary signal Z of the same state, and each time the signal decreases, the first binary signal A is output followed by a second binary signal A in the same state. The up/down counter 20 is controlled by the output from the encoder 29 being applied to its "+" input for each increase in the voice signal and to its "−" input for each decrease in the voice signal. Each time the bistable device 21 changes state, the counter 27 is reset to zero and thereafter counts clock pulses at 6 millisecond intervals. When the counter 27 reaches its maximum count, which in the case shown in FIG. 2 is seven steps of 6 milliseconds, the output T from the timing counter 27 enables the OR gates 25 and 26 to pass incremental control pulses from the clock 19 via the gates 22 and 23. In contrast, if the gates 22 and 24bis are enabled by one of the outputs $S_1$ or $S_2$ from the threshold detector 12 respectively, while the counter 27 is counting, the AND gate 22 is enabled only if the bistable device 21 already has its Q output in the one state and the gate 24bis is only enabled via the AND gate 23 if the bistable device 21 has its output $\bar{Q}$ in the one state. This ensures that changes between counting up and counting down or vice versa do not occur unless there has been a predetermined lapse of time, 42 milliseconds in this case, since the first signal of the same phase or since the last change in phase.

An embodiment of the interpolator circuit 17 is now described with reference to the block diagram of FIG. 3. The interpolator circuit 17 comprises: an assembly of shift registers 30, itself comprising subassemblies of registers 31 and 32; a second assembly of shift registers 33 comprising sub-assemblies 34 and 35; a circuit 37 for correcting the received level-representing data signals; an incrementation circuit 38 for increasing or decreasing the attenuation level of the attenuator 18; and a phase sequencer 39. A clock 36 provides synchronization between all the parts of the interpolator circuit 17. The shift register subassembly 31 has its inputs connected directly to the input 9 of the apparatus 1 as shown in FIG. 1 to receive the signals A or Z from the demodulator of the receiver (not shown) as transmitted over the auxiliary channel to indicate binary increase or decrease decisions. The sub-assembly of registers 31 is also connected to the input 10 of the apparatus 1 as shown in FIG. 1 to receive the binary weighting signal e which inhibits the A and Z value signals as received via the input 9 whenever it is present. The use of the binary signal e constitutes a simple weighting technique which is most applicable to transmissions that are subject to large variations in the signal/noise ratio or where a transmission is subject to large amounts of interference or jamming. The signals e, A and Z, as applied to the input of the shift sub-assembly 31, are stored therein as soon as a clock pulse appears from the clock 36 and they are transferred on the arrival of the next clock pulse from the register sub-assembly 31 to the register sub-assembly 32. The sub-assembly 32 consequently contains at each instant $n+1$ as defined by a clock pulse, data $D_n$ representative of the decisions e, A, Z as received at the preceding clock instant n, while the register 31 registers at each clock instant data $D_{n+1}$ representative of the decisions e, A, Z which are currently being received by the receiver device. The data $D_n$ and $D_{n+1}$ are transmitted to the corresponding inputs of the connection circuit 37 which serves to correct the decisions A or Z as transmitted from the demodulation circuit (not shown) to the interpolator circuit 17 so as to take account of the constraints introduced on the transmitted signals and which correspond to the conditions in which three bits succeed one another as required by the apparatus before authorizing the application of a new control signal to the attenuators. A count is also taken of the preceding decisions $A_c$ or $Z_c$ as previously corrected and also the preceding decisions I which are interpreted by the apparatus as being indeterminate. The correction circuit 37 establishes its corrections as a function of the corrected decisions $D_{(n-1)c}$ at instant $n-1$, and on the phase data B+ and B− as reconstituted by the phase sequencer 39.

The register sub-assembly 34 is connected via its inputs to the correction circuit 37 in order to store the corrected decisions $A_c$ and $Z_c$ as generated by the correction circuit 37. The data stored in the registers 34 are transferred on the arrival of the following clock pulse to the register sub-assembly 35 which thus stores the corrected data $D_{(n-1)c}$ at instant $n-1$ which data is used for correcting decisions at instant n. The register sub-assembly 35 is connected for this purpose via its outputs to corresponding inputs of the correction circuit 37 to enable the correction circuit 37 to generate correction data for the current data received at instant n as a function of the data as corrected at instant $n-1$. The correction data generated by the correction circuits 37 is also transmitted to the incrementation circuit 38 to calculate at each instant n the +1 or −1 incrementation rate which should be applied by the interpolator 17 to the control input of the variable attenuator 18 shown in FIG. 1. The correction circuit 37 also provides signals PP+ and PP− where it is presumed that incrementation has passed into a positive phase or into a negative phase together with the correction decisions $A_c$ and $Z_c$ for application to the corresponding inputs of the phase sequencer 39 in order to verify that the constraints imposed by the logical filter circuit 13 in the transmitter (FIG. 1) are adhered to on reception. In order to do this, the phase sequencer 39, which reconstitutes the positive or negative phases for growth or for shrinkage of the speech signal as determined on transmission, applies the reconstituted phase conditions P+ and P− to the corresponding inputs of the correction circuit 37. The phase conditions P+ and P− are also established as a function of the signals +I and −I transmitted by the incrementation circuit 38 to the corresponding inputs of the phase sequencer 39 which signals correspond to the incrementing decisions +1 and −1.

In the embodiment shown, the correction circuit 37 and the incrementer 38 are now described with reference to the circuit diagram of FIG. 4. In FIG. 4, the correction circuit 37 comprises an assembly of gates 40 to 46. The gate 40, in conjunction with the gate 41, determines the correction decision $A_c$ for the received data. The gate 40 is an OR gate having two inputs which are connected respectively to the output of the gate 41 and to the corresponding output from the registers 32 which transmits the decision signal A. The output from the gate 40 transmits the corrected decision signal $A_c$ whenever a decision A is transmitted by the register 32 or whenever a signal PP+ of a presumed positive phase is transmitted by the output from the gate 41. Signal PP+ is transmitted by the gate 41 at each instant n+1 whenever the weighting signal e is provided by the receiver demodulator at the preceding instant n while the phase sequencer 39 of FIG. 3 indicates that the apparatus is dealing with a voice signal in a negative phase P− and the decision signals received at instants n−1 and n+1 are Z signals. To provide this condition, the gate 41 is a three-input AND gate having a first input connected to the output of a two-input OR gate 42. A second input is connected to the phase sequencer 39 and receives the phase indicating signal P−, and the third input is connected to the register sub-assembly 32 and receives the weighting signal e. A first input of the OR gate 42 is connected to the storage sub-assembly 35 and receives the corrected decision $Z_c$ of instant n−1. The second input of the OR gate 42 is connected to the storage sub-assembly 31 and receives the decision Z made at instant n+1.

In a somewhat manner, the gate 43, in conjunction with the gate 44, determines the correction decision $Z_c$ for the received data. The gate 43 is a two-input OR gate having its inputs connected respectively to the output from the gate 44 and to the corresponding output from the registers 32 which transmits the decision signal. The output of the gate 43 transmits the corrected decision signal $Z_c$ whenever a decision Z is transmitted by the registers 32 or whenever a signal PP−, presuming a negative phase, is transmitted from the output from the gate 44. The signal PP− is transmitted by the gate 44 at each instant n+1 whenever an weighting signal e has been transmitted by the receiver demodulator at the preceding instant n and the phase sequencer indicates that the apparatus is dealing with a voice signal in a positive phase and the decisions obtained by the receiver at instants n−1 and n+1 are A decisions. To achieve this condition, the gate 44 is a three-input AND gate having its first input connectd to the corresponding output from the phase sequencer 39 which transmits positive phase data P+. The second input of gate 44 is connected to the output from the OR gate 45 which receives the corrected decision data $A_c$ contained in the register sub-assembly 35 via a first input and which receives the uncorrected decision A contained in the register sub-assembly 31 via second input. The third input of the AND gate 44 is connected to the corresponding output from the registers 32 which transmits the inhibit signal. The corrections provided by the gates 40 and 43 consequently express the fact that in negative phase there cannot be a consecutive sequence of Z decisions (ZZ) and in positive phase there cannot be a consecutive sequence of A decisions (AA). The outputs from the gates 40 and 43 are connected to respective inputs of a NAND gate 46. The output from the gate 46 delivers an indeterminate decision I when neither an $A_c$ nor a $Z_c$ appears at the outputs from the gates 40 and 43.

The incrementation circuit 38 comprises logic circuits 47 to 59. The incrementation control signal marked +1 is provided by the output from an OR gate 47 having two inputs, the first of which is connected to the output from the AND gate 48. The AND gate 48 has two inputs, the first of which is connected to the output of the OR gate 43 and the second of which receives the corrected signal $Z_c$ as stored in the register sub-assembly 35. In this arrangement, the circuits 47 and 48 authorize a +3 decibel increase in the receiver attenuator whenever the decisions contained in the registers 32 and 35 both correspond to a $Z_c$ decision. The signal for controlling a −3 decibel change or decrementation is provided by the output from the OR gate 49 which has two inputs one of which is connected directly to the output of the AND gate 50 which also has two inputs. A first input of the AND gate 50 is directly connected to the output of the OR gate 40 and the second input of the AND gate 50 directly receives the corrected decision $A_c$ as contained in the register sub-assembly 35. A decrementation command for changing the attenuation by −3 decibels is consequently supplied by the OR gate 49 and by the AND gate 50, provided the decisions contained in the register sub-assemblies 32 and 35 both correspond to a corrected decision $A_c$. If no decision is provided by the outputs of the OR gates 47 and 49, the attenuation of the variable attenuator 18 in FIG. 1 remains unchanged. Another logic circuit formed by the circuits 51 to 59 process the case which, taking account of the phase in which the apparatus is currently situated, can only be dealt with on average, either by a half phase more or by a half phase less. These cases are collated on the inputs to gates 51 and 52 each of which has three inputs. The AND gate 51 is connected by a first input to the output from the OR gate 53 which itself has two inputs, one of which is connected directly to the output from the AND gate 54. The AND gate 54 has two inputs the first of which receives the corrected decision $A_c$ as contained in the register sub-assembly 35 and the second of which is directly connected to the output from the NAND gate 46. The second input from the OR gate 53 receives the indeterminate decision i from the register sub-assembly 35. The second input to the AND gate 51 receives the negative phase signal P− from the phase sequencer 39. The third input from the AND gate 51 is directly connected to the output of an inverter 55. The output from the gate 51 is directly connected to the input of a bistable device 56 whose output is directly connected to the second input of the OR gate 49.

The bistable device 56 is controlled by the AND gate 51 each time the following conditions are met simultaneously: the apparatus is in negative phase P−; the decision taken at instant n+1 contained in the register 31 is not an inhibit decision; and the decision taken at the preceding instant n was indeterminate while the decision taken at the instant n−1 was an A decision.

In a substantially similar manner, the AND gate 52 has a first input connected to the output of a two-input OR gate 57. A first input of the OR gate 57 is connected to the output of a two-input AND gate 58 having a first of its inputs connected to the output from the NAND gate 46 and the second of its inputs connected to receive the corrected decision $Z_c$ contained in the register subassembly 35. The second input to the AND gate 52 receives the phase signal P+ transmitted by the phase sequencer 39 of FIG. 3. The third input of the AND gate 52 is directly connected to the output of the inverter 55. The output from the AND gate 52 is directly connected to the input of a bistable device 59 whose output is directly connected to the second input of the OR gate 47. The bistable device 59 is controlled by the AND gate 52 each time the following conditions are simultaneously true: the apparatus is in positive phase P+; the decision taken at an instant n+1 contained in the register 31 is not an inhibit decision; and the decision taken at the instant n was indeterminate while the decision taken at the instant n−1 was a Z decision. The assembly of circuits 49 and 59 serves to recover indeterminate decisions which in the negative phase may be considered to have an average value of one-half since they cannot be corrected either to zero or to +1. The bistable devices 56 and 59 eliminate every other decision transmitted by the gates 51 and 52 and the increments which they store are added to those which are transmitted respectively by the gates 48 and 50 via the OR gates 57 and 49. The +1 and −1 increments transmitted respectively via the gates 47 and 49 are applied to the attenuator on each clock pulse. Likewise, on each clock pulse the signals I+ and I−, which correspond to direct decisions to increment or to decrement, are transmitted via the gates 48 and 50 to the phase sequencer.

Figure 3:
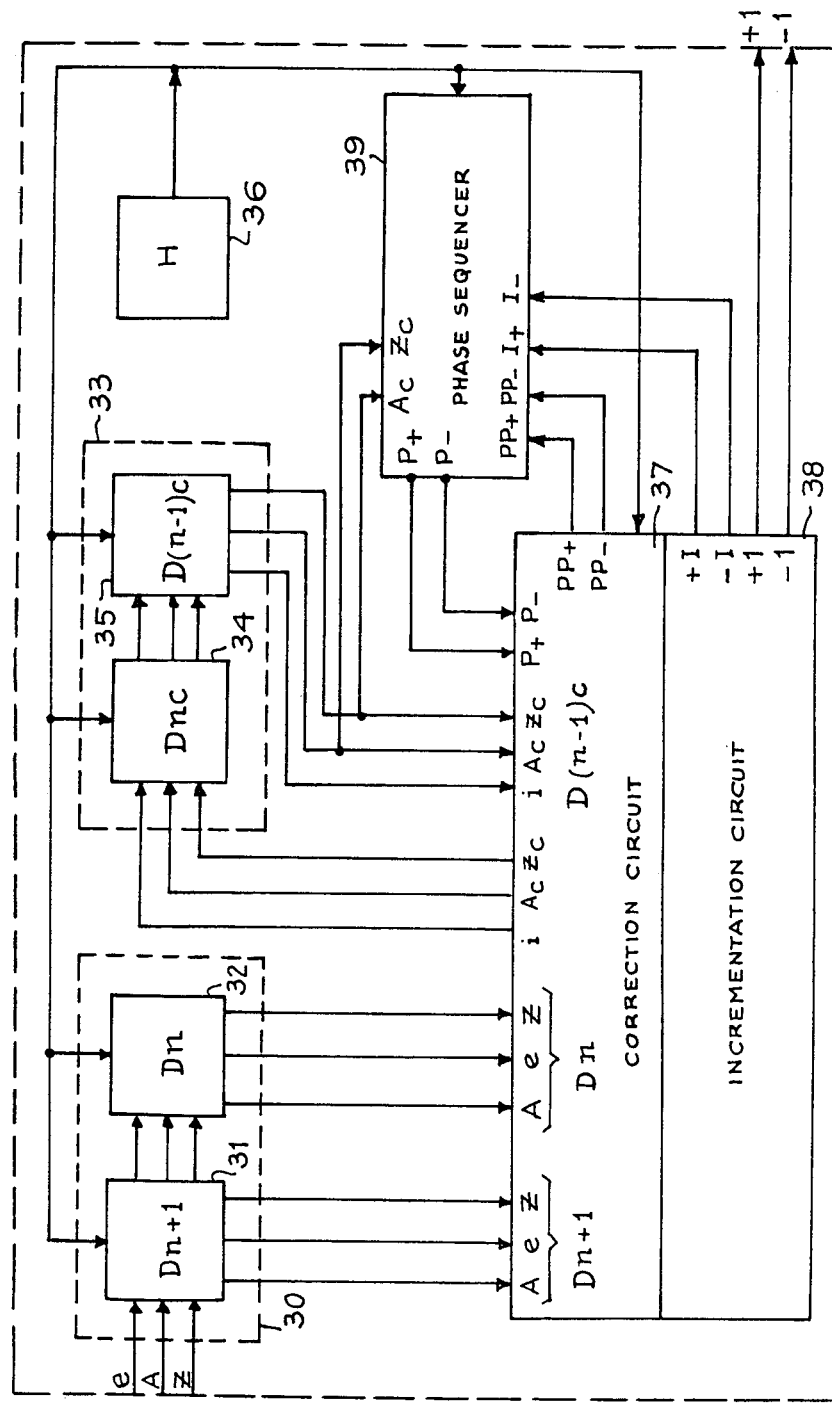
FIGS. 3 to 5 are circuit diagrams of the interpolation circuit used in reception.
Figure 4:
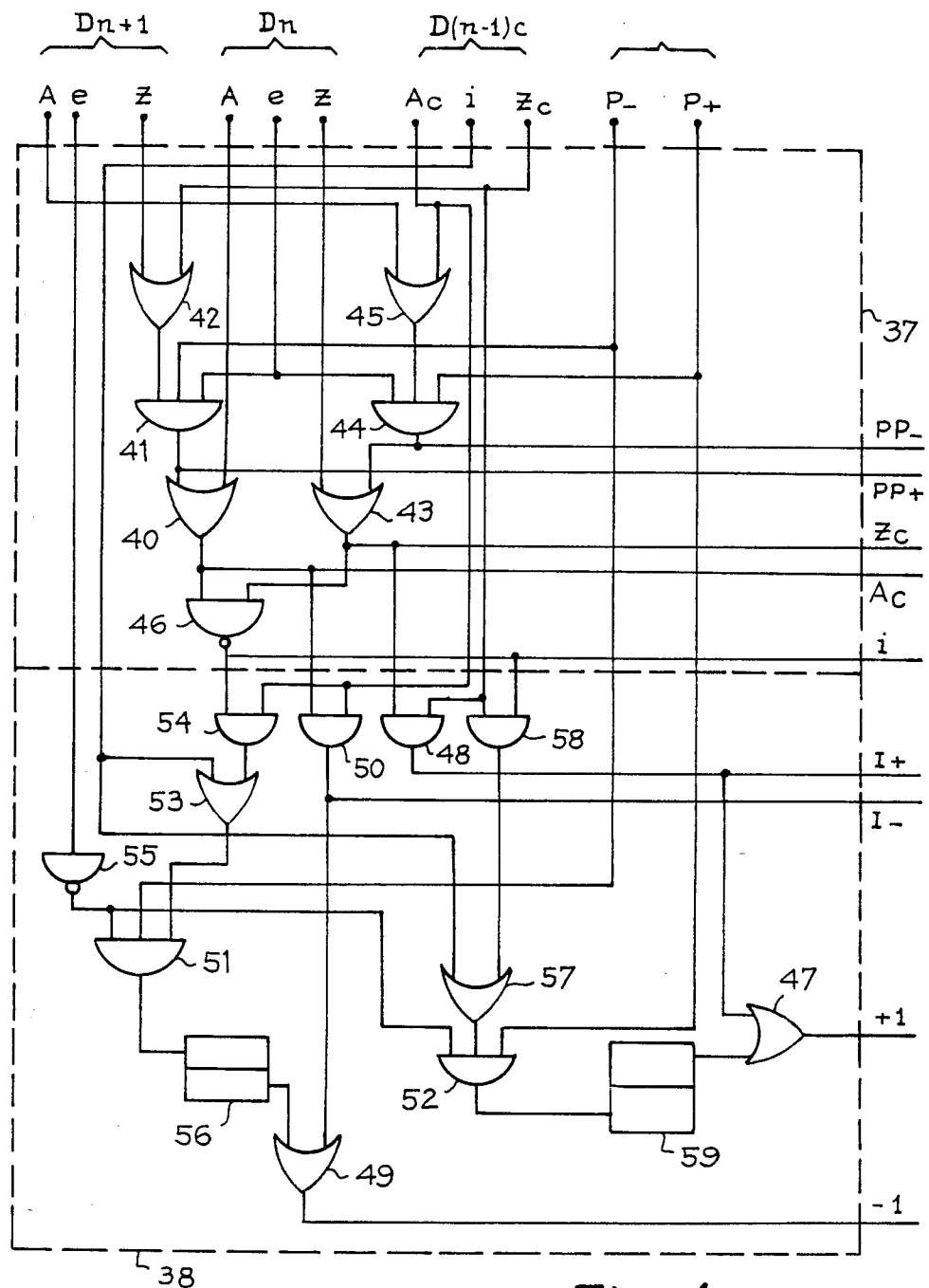
Figure 5:
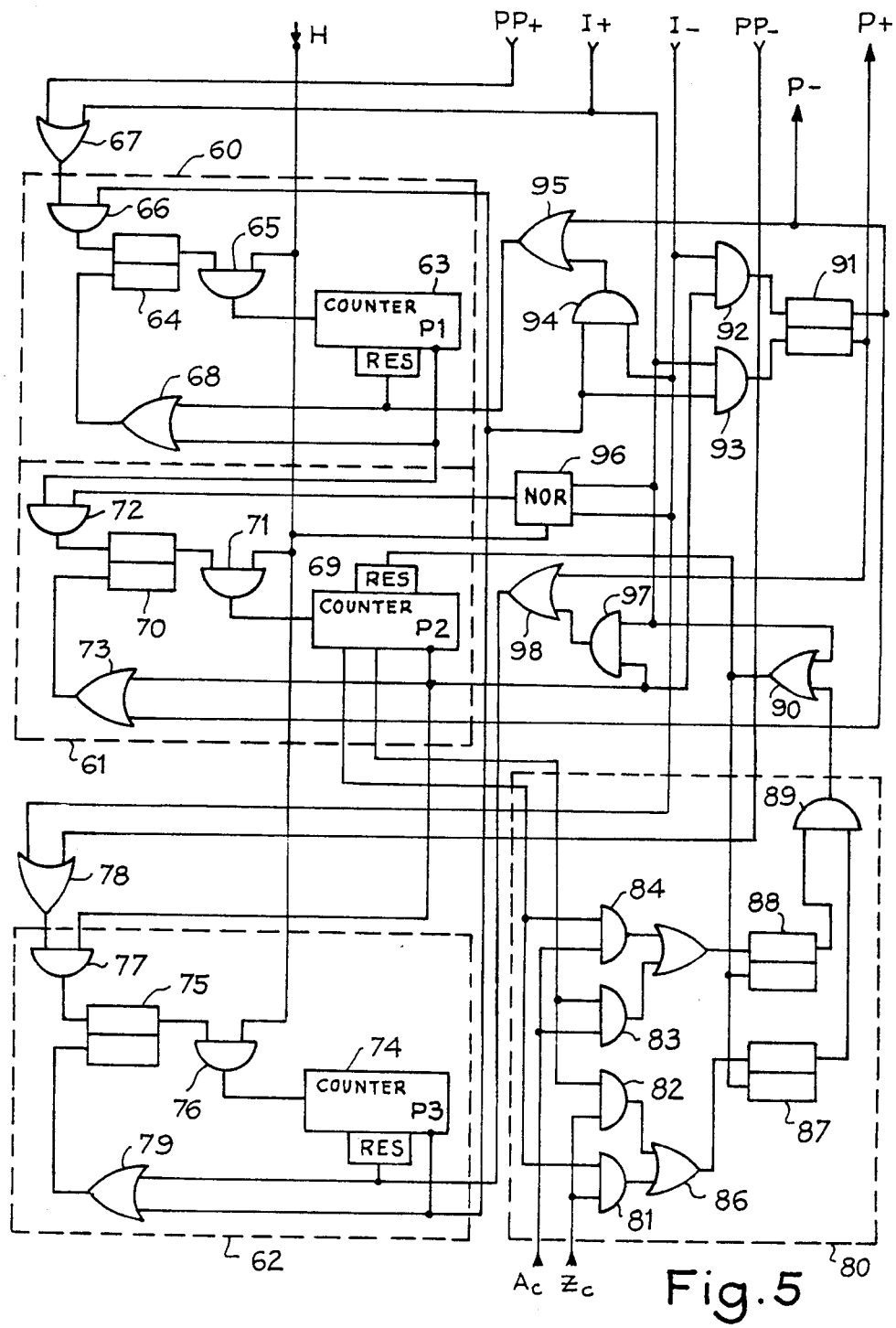

An embodiment of the phase sequencer 39 in FIG. 3 is now described with reference to the block diagram of FIG. 5. The phase sequencer shown in FIG. 5 comprises: a positive phase sequencer device 60; an intermediate phase sequencer device 61; and a negative phase sequencer device 62. The positive phase sequencer device comprises a counter 63 having its count input connected to a bistable device 64 via a two-input AND gate 65. The first input of the AND gate 65 is connected to the clock 36 shown in FIG. 3. The second input of the AND gate 65 is connected to the output from the bistable device 64. A first input to the bistable device 64 is connected to the output of a two-input AND gate 66 and the second input for resetting the bistable device 64 to zero is connected to the output of a two-input OR gate 68.

The "intermediate" phase sequencer device 61 likewise comprises a counter 69 having its count input connected to the output of a bistable device 70 via a two-input gate 71. A first input of the gate 71 is connected to an output from the clock 36 of FIG. 3 and the second input to the gate 71 is connected to the output from the bistable device 70. The bistable device 70 has a first input connected to the output of the two-input AND gate 72 and has its second or reset to zero input connected to the output from a two-input OR gate 73.

The negative phase sequencer 62 likewise comprises a counter 74 having its count input connected to the output of a two-input AND gate 76.

A first input of the AND gate 76 is connected to the output from the clock 36 of FIG. 3 and the second input is connected to the output from the bistable 75. The control input to the bistable device 75 is connected to the output of a two-input AND gate 77 and the reset to zero input of the bistable device 75 is connected to the output from a two-input OR gate 79. The phase sequencer devices 60, 61 and 62 are synchronised by a circuit 80 having logic components 81 to 89 together with circuits 90 to 98. The circuit 80 comprises 4 two-input AND gates 81 to 84. The outputs of the gates 81 and 82 are respectively connected to corresponding inputs of an OR gate 86 whose output is connected to the control input of a bistable device 87. Likewise, the outputs from the gates 83 and 84 are respectively connected to corresponding inputs of a two-input OR gate 85 whose output is connected to the control input of a bistable device 88. The outputs from the bistable devices 87 and 88 are respectively connected to corresponding inputs of a two-input AND gate 89. The gates 81 and 82 have a first input receiving the corrected decision $Z_c$ from the correction circuit 37 of FIG. 3, and the gates 83 and 84 each have a first input connected to receive the corrected decision $A_c$ provided by the correction circuit 37 of FIG. 3. The second inputs of the gates 81 and 84 are respectively connected to the outputs of the counter 69.

The output of the gate 89 is connected to a first input of a two-input OR gate 90 whose other input receives the signal I+ coming from the incrementation circuit 38 of FIG. 3. The output from the OR gate 90 is connected to the reset to zero inputs of the counter 69 and of the bistable devices 87 and 88. The logic circuit 91 is a bistable device whose state indicates, to the device as a whole, which of the positive and negative phases, marked P+ or P−, corresponds to the received signals. The bistable device 91 is controlled by the outputs from the gates 92 and 93. The AND gate 92 has two inputs the first one being connected to the signal I− transmitted by the incrementation circuit 38 of FIG. 3, while the second input is connected to the most significant bit output P2 from the counter 69. The gate 93 has two inputs, a first one being connected to receive the signal I+ as transmitted by the incrementation circuit 38 while the second input is connected to the most significant bit output P3 from the counter 74. The signal I− is likewise applied to a first input of an AND gate 94 whose second input is also connected to the most significant bit output P3 of the counter 74. The output from the AND gate 94 is connected to a first input of an OR gate 95 whose second input is connected to the output from the bistable device 91 which transmits the negative phase noted P−. The output from the OR gate 95 is connected to the reset to zero inputs of the counter 63 and to a first input of an OR gate 68 whose second input is connected to the most significant bit output P1 of the counter 63. A NOR gate 96 has its output connected to a first input to the AND gate 72 whose second input is connected to the most significant bit output P1 from the counter 63. The NOR gate 96 has two inputs, the first of which receives the signal I+ transmitted by the incrementation circuit 38 of FIG. 3 and the second of which receives the signal I− likewise transmitted by the same incrementation circuit. The NOR gate 96 is furthermore enabled by the clock signal supplied by the clock 36 of FIG. 3.

The apparatus shown in FIG. 5 operates as follows. The phase sequencer verifies that the constraints imposed by the logical filter at the transmission end are complied with on reception. To do this it determines whether the positive and negative phases, respectively P+ and P−, correspond to the positive or increasing or to the negative or decreasing phases of the voice signal and sends consequential corrections and decisions to the correction circuit 37 and to the incrementation circuit 38. As indicated above, the positive phase is characterised by a growth portion designated P+ in which the possible increments applied to the attenuator are either zero or else +1, and it also includes a maintenance portion operating at constant or "intermediate" phase which precedes switching over to the negative or shrinkage phase designated by P− or else a return to the positive phase, and during which no +1 increment is given. The characterizing portions of the positive phase are respectively monitored by the phase sequencer devices 60 and 61. The negative or shrinkage phase of the voice signal which follows the positive phase is monitored by the sequencer device 62. The sequencer device 60 determines the duration of the positive phase, said duration being determined by the counting time of the counter 63 whose count is initialized by the bistable device 64 together with the gates 65 and 66. When initialization is performed by the bistable device 64 and the gate 66, the gate 65 is opened to pass the clock signals H to cause the counter 63 to count elementary clock instants which occur ever 6 milliseconds. If the counting capacity of the counter 63 is eight, the counter 63 will have reached its maximum count after 42 milliseconds and then send a signal on its P1 output to the OR gate 68 which resets the bistable 64 to zero thereby preventing the counter 63 from counting further. The bistable device 64 can also be reset to zero by an external control signal coming from the output of the OR gate 95.

The sequencer devices 61 and 62 operate in a similar manner. The counter 69 is initialized by the circuit 70, 71 and 72 and the bistable device 70 is reset to zero by the OR gate 73, either when the counter 69 has reached its maximum count capacity or else when an external signal is applied to the gate 73 by the output of bistable device 91 delivering the signal P+ denoting positive phase. The initialization circuit for the sequencer device 62 is likewise composed of circuits 75, 76 and 77 which are similar to the initialization circuits described above. Initialization takes place when the bistable device 75 is set to 1 by the gate 76 and the bistable device 77 is set to zero by the OR gate 79, or else when the counter 74 has reached its maximum capacity, or else when an external signal is applied from the OR gate 98. The bistable device 91 indicates the sense in which the voice signal is changing by delivering the positive phase and negative phase signals P+ and P− respectively at its outputs for use by the correction circuit 37 and the incrementation circuit 38. When the receiver portion is not receiving the signals Z and A, the counter 74 of the negative phase sequencer device 62 reaches its maximum capacity and delivers, for as long as it is at maximum capacity, a signal on its output P3, and the phase bistable device 91 is in the state P− corresponding to the negative phase. The absence of received signal ought to be accompanied by a demodulation sequence of weighting signal e which has no affect on the apparatus. When the first I+ decision is supplied by the incrementation circuit 38 and applied to the OR gate 67, the counter 63 is initialized. Provided the signal P3 is applied to the AND gate 93, the signal I+ also causes the phase bistable device 91 to change over to the state P+ which corresponds to a positive phase, and consequently the counter 74 of the negative phase sequencer device 62 is reset to zero and is held to zero by the OR gate 98.

After being initialized, the counter 63 counts up 7 clock pulses in succession and on reaching its maximum capacity it applies a signal via its output P1 to the corresponding input of the OR gate 68 to reset the bistable device 64 to zero and to stop the counter 63. The signal provided by the output P1 from the counter 63 is also applied to the corresponding input of the gate 72 and on the first nil decision which is neither an I+ decision nor an I− decision, the NOR gate 96 causes the counter 69 of the intermediate phase sequencer device to be initialized by enabling the circuits 70 to 72. The counter 69 is reset to zero either by each new I+ decision applying an I+ signal to the corresponding input of the OR gate 90, or else by a parity fault monitored by means of the circuit 90 which indicates that during the count there has been an odd number of sequences ZZ or that one of two consecutive Z decisions was demodulated as being a weigh signal e.

The circuit 80 receives the corrected sequence $A_c$ or the corrected sequence $Z_c$ supplied by the correction circuit 37 on the inputs of a group of four gates 81 and 84 which are controlled by the counter 69. If a sequence does not show an AZ alternation characteristic of the zero sequences of no incrementation, both bistable devices 87 and 88 are placed in the one logic state to reset the counter 69 to zero via the gates 89 and 90. When the counter 69 reaches its maximum count capacity, the minimum duration of the intermediate or constant phase is monitored, and this phase may be followed either by a continuation of the preceding positive phase or else by switching over to a negative phase. In the first case, the first I+ signal received by the OR gate 90 resets the counter 69 to zero which then begins to count again. In the second case, the first I− signal to be received causes the bistable device 91 to change over to the P− phase thereby causing the counter 74 to start counting again by means of signals passing through the OR gate 78 and the AND gate 77 and also resetting to zero the counters 63 and 69 via the OR gates 95 and 90.

When the counter 69 reaches its maximum count capacity and in the presence of a PP− signal applied to the gate 78 indicating that the correction circuit 37 of FIG. 3 is presumed to be in negative phase, the counter 74 is again enabled to count, but since the phase bistable device 91 indicates a positive phase P+, the counter 74 is stopped again and reset to zero by the OR gate 98 and the AND gate 97 whose inputs receive the signal I+ and the signal transmitted from the output P2 from the digit 3 position of the counter 69 before an I− signal transmitted by the incrementation circuit 38 arrives to enable a switchover to the negative phase by changing the state of the bistable device 91. Thus, if corrections arrive which mask the possibility of changing over to negative phase while the receiver portion is in the positive phase and after the minimum duration as counted by the intermediate counter 69 elapsed, the counter 74 is given the benefit of the doubt and is started in anticipation. The function of the first non-corrected A decision is to confirm or to disprove this hypothesis. The negative phase operates in the same manner as the positive phase except that there is no intermediate counting stage as performed by the sequencer device 61 which is connected in series with the postive phase sequencer device 60.

Once the counter 74 has reached its maximum count capacity indicating that a minimum phase has lasted for a minimum duration of 42 milliseconds, its P3 output is used, as in the positive phase case, to enable the counter 63 to be started in anticipation by the gates 66 and 67 supposing that a positive phase is presumed as indicated by the appearance of the signal PP+. If this presumption is not confirmed by an I+ decision from the incrementation circuit 38 of FIG. 3, the counter 63 is reset to zero by the I− decision which instead confirms continuation of the negative phase.

Although the principles of the present invention have been described above with reference to a particular embodiment, it will readily be understood that the scope of the invention is not limited to the example described. For example, it will be understood that the functions of the apparatus could be implemented by other means, and in particular they could be integrated in whole or in part in a microprocessor device. More particularly, the compression circuit could be formed by a memory for storing the speech signal to be transmitted and coupled to a processor in such a manner as to delay the speech signal to be transmitted and to regulate the amplitude thereof to a constant level on transmission, as well as to attenuate the speech signal as directly received with a value of attenuation from the previously delayed speech signal so as to apply an attenuated speech signal to the input of the logical filter circuit. It will also be understood that the invention could be usefully applied to any process in which speech is encoded in analog or in digital form. In an analog implementation, the auxiliary level-representing channel would still be digital and the level-representing data would be transmitted by means of frequency multiplexing the data together with the speech signals, for example in the manner which has already been applied to high frequency channels in the known SYNCOMPEX system.

In a digital embodiment, the device could advantageously be applied to packet transmission of speech together with time multiplexing. An average transmission speed in the V or UHF frequency ranges of around 16 K/bits per second could be used, together with fixed frequency or frequency hopped transmission channels. At a lower transmission rate of around 2,400 bits per second, the apparatus in accordance with the invention could be used in various kinds of vocoder devices.

We claim:

1. Apparatus for processing an input voice signal into a transmission voice signal having a substantially constant level, and for processing a reception voice signal having a substantially constant level into an output voice signal, and for processing digital data representing variations in level of a syllabic term of said voice signals, said transmission and reception voice signals being transmitted to/received from a radio transmitter/receiver main channel, said digital data being transmitted to/received from a radio transmitter/receiver auxiliary channel, comprising:
   incremental compreessor means for compressing said input voice signal to provide said transmission voice signal;
   threshold detector means, coupled to said incremental compressor means, for detecting variations in level of said syllabic term of said input voice signal;
   control means, coupled to said incremental compressor means and controlled by said threshold detector means, for maintaining said transmission voice signal at a substantially constant level, and for providing said digital data to said auxiliary channel;
   expander means for receiving said reception voice signal and providing said output voice signal; and
   interpolator means, coupled to said expander means, for receiving said digital data from said auxiliary channel and controlling said expander means to cause a level of said output voice signal to be reestablished, and for correcting errors in said received digital data.

2. Apparatus according to claim 1 wherein, said digital data provided by said control means are arranged in sequences of bits which have a first configuration when said syllabic term is in increasing phase, a second configuration when said syllabic term is in decreasing phase, and at least one third configuration when said syllabic term is in a substantially constant phase, and wherein said interpolator means includes:
   means for detecting increasing phase, decreasing phase, and substantially constant phase in the configuration of said sequences of bits, and controlling said expander means in accordance with the configuration of said sequences of bits; and
   correcting means for weighting sequences of bits received from said auxiliary channel when uncertainty exists about the validity of at least one bit in a given sequence of bits, and for controlling said expander means in accordance with said weighted sequences of bits to correct for errors in transmission of said digital data.

3. Apparatus according to claim 2 wherein each weighted sequence of bits is weighted as a function of the configuration of a preceding sequence of bits.

4. Apparatus according to claim 2 wherein each weighted sequence of bits is weighted as a function of (a) the configuration of a preceding sequence of bits, and (b) the configuration of a following sequence of bits.

5. Apparatus according to claim 2 wherein said incremental compressor means includes:
   first incremental variable attenuator means for attenuating said input voice signal to provide said transmission voice signal;
   delay means for delaying said input voice signal delivered to said first attenuator means; and
   second incremental variable attenuator means for delivering an undelayed voice signal to said threshold detector means.

6. Apparatus according to claim 5 wherein said threshold detector means provides signals to said control means which indicate when a level of said undelayed voice signal crosses predetermined thresholds, to cause said control means to provide variable attenuation values which are increasing, decreasing, or substantially constant, to said first and second attenuator means.

7. Apparatus according to claim 6 wherein said threshold means includes first and second predetermined thresholds, and wherein said control means includes:
   up/down counter means for providing incremental attenuation values to said first and second attenuators; and
   control logic means, coupled to said threshold detector means, for incrementing said up/down counter means when said undelayed voice signal level exceeds said first predetermined threshold, and for decrementing said up/down counter means when said undelayed voice signal level falls below said second predetermined threshold; said control logic means including:

a bistable device which assumes a first logic state when said undelayed voice signal level exceeds said first predetermined threshold, and assumes a second logic state when said undelayed voice signal level falls below said second predetermined threshold;

a timing counter having a maximum value; and control gate means, coupled to said threshold detector means and enabled by said bistable device and said timing counter, for placing said up/down counter means in one of an up counting mode and a downcounting mode, and for preventing any change of mode by said up/down counter means unless said timing counter has exceeded its maximum value since a previous change of mode.

8. Apparatus according to claim 2 wherein said interpolator means controls said expander means with a weighted sequence of bits derived from a preceding sequence of bits when the validity of said given sequence of bits is rendered uncertain by comparison of said given sequence of bits with said preceding sequence of bits and a following sequence of bits which follows said given sequence of bits.

9. Apparatus according to claim 8 wherein said interpolator means includes a phase sequencer having:

an increasing phase sequencer for fixing a minimum duration of said increasing phase to a first constant value;

an intermediate phase sequencer, atarted by said increasing phase sequencer at an end of said increasing phase duration, for fixing a minimum duration of said intermediate phase to a second constant value;

a decreasing phase sequencer, started by said intermediate phase sequencer at an end of said intermediate phase duration, for fixing a minimum duration of said decreasing phase to a third constant value; and bistable means, coupled to said intermediate and said decreasing phase sequencers, for providing positive and negative phase signals to said correcting means.

10. Apparatus according to claim 9, wherein said interpolator means controls said expander means by providing attenuation information thereto, and wherein said interpolator means further includes:

first register means for temporarily storing (a) the bits of said sequences of bits which are successively received from said auxiliary channel, and (b) a weighting signal received from said auxiliary channel and used by said correcting means for said weighting of sequences of bits;

second register means, coupled to said correcting means, for temporarily storing said weighted sequences of bits; and incremenation means, coupled to said correcting means and to said phase sequencer for incrementing and decrementing said attenuator information in constant steps, and providing said attenuation information to said expander means.

11. Apparatus according to claim 10, wherein said correcting means includes:

first means for generating a corrected increase signal whenever said weighting signal was received during reception of said preceding sequence of bits and said phase sequencer indicates that said phase is decreasing, and whenever said weighted sequence of bits and a sequence of bits received immediately prior to said preceding sequence of bits both indicate decreasing phase; and second means for generating a corrected shrinkage signal whenever said weighting signal was received during reception of said preceding sequence of bit and said phase sequencer indicates that said phase is increasing, and whenever said weighted sequence of bits and said sequence of bits received immediately prior to said preceding sequence of bits both indicate increasing phase.

12. Apparatus according to claim 10 wherein said incremenation means provides said attenuation information in the form of (a) an incremenation signal each time said weighted sequence of bits indicates increasing phase, and (b) a decrementation signal each time said weighted sequence of bits indicates decreasing phase.

13. Apparatus according to claim 12 wherein said control means includes an up/down counter which provides attenuation values, incremented in steps, to said compressor means, and wherein said incremenation means further includes means for recovering indeterminate sequences of bits which cannot be weighted to cause said up/down counter to be incremented or decremented one complete step, said recovering means providing a value $+\frac{1}{2}$, $-\frac{1}{2}$ complete step when said indeterminate sequences of bits indicate increasing and decreasing phases, respectively.

* * * * *